United States Patent
Mitsumoto et al.

(10) Patent No.: US 10,696,853 B2
(45) Date of Patent: Jun. 30, 2020

(54) COATING FLUID COMPOSITION, METHOD FOR FORMING COATING FILM, PROCESS FOR PRODUCING COATING FLUID COMPOSITION, DEVICE FOR PRODUCING COATING FLUID COMPOSITION, AND COMPOSITION FOR PREPARING COATING FLUID COMPOSITION CONTAINING CARBON DIOXIDE

(71) Applicant: NAGASE & CO., LTD., Osaka-shi (JP)

(72) Inventors: Masataka Mitsumoto, Amagasaki (JP); Noriaki Hayasaka, Kami-gun (JP)

(73) Assignee: NAGASE & CO., LTD., Osaka-shi (JP)

( * ) Notice: Subject to any disclaimer, the term of this patent is extended or adjusted under 35 U.S.C. 154(b) by 212 days.

(21) Appl. No.: 16/066,280

(22) PCT Filed: Mar. 18, 2016

(86) PCT No.: PCT/JP2016/058728
§ 371 (c)(1),
(2) Date: Jun. 26, 2018

(87) PCT Pub. No.: WO2017/154222
PCT Pub. Date: Sep. 14, 2017

(65) Prior Publication Data
US 2019/0010339 A1 Jan. 10, 2019

(30) Foreign Application Priority Data
Mar. 9, 2016 (JP) ................... 2016-045654

(51) Int. Cl.
C09D 7/20 (2018.01)
B05D 1/02 (2006.01)
C09D 201/00 (2006.01)
C09D 7/61 (2018.01)
C09D 133/00 (2006.01)
C09D 7/80 (2018.01)
C09D 133/14 (2006.01)
C09D 175/06 (2006.01)
C08K 3/20 (2006.01)

(52) U.S. Cl.
CPC ............ C09D 7/20 (2018.01); B05D 1/02 (2013.01); C09D 7/61 (2018.01); C09D 7/80 (2018.01); C09D 133/00 (2013.01); C09D 133/14 (2013.01); C09D 175/06 (2013.01); C09D 201/00 (2013.01); *B05D 2401/00* (2013.01); *C08K 3/20* (2013.01)

(58) Field of Classification Search
CPC ..................... C09D 7/20; B05D 1/02
See application file for complete search history.

(56) References Cited

U.S. PATENT DOCUMENTS

| | | | | |
|---|---|---|---|---|
| 3,870,651 A * | 3/1975 | Pipkins | ............... | C09D 11/03 252/364 |
| 4,923,720 A | 5/1990 | Lee et al. | | |
| 5,009,367 A * | 4/1991 | Nielsen | ............... | B05D 1/025 239/3 |
| 5,066,522 A * | 11/1991 | Cole | ............... | B05D 1/025 427/422 |
| 5,106,650 A | 4/1992 | Hoy et al. | | |
| 5,312,862 A | 5/1994 | Nielsen et al. | | |
| 5,509,959 A * | 4/1996 | Nielsen | ............... | B05D 1/025 106/287.35 |
| 8,637,595 B2 * | 1/2014 | Wuerch | ............... | B65D 83/752 524/271 |
| 9,574,095 B2 * | 2/2017 | Son | ............... | C09D 11/033 |
| 2002/0161056 A1 * | 10/2002 | Carnahan | ............... | C09J 11/00 516/1 |

FOREIGN PATENT DOCUMENTS

| | | |
|---|---|---|
| CN | 102369067 | 3/2012 |
| CN | 103582681 | 2/2014 |
| EP | 2940083 | 11/2015 |
| JP | H1-258770 | 10/1989 |
| JP | H7-096154 | 4/1995 |
| JP | H8-252449 | 10/1996 |
| JP | 2002-511907 | 4/2002 |
| JP | 4538625 | 9/2010 |
| JP | 2010-234348 | 10/2010 |
| JP | 2012-086145 | 5/2012 |
| JP | 2012-086175 | 5/2012 |
| JP | 2013-103151 | 5/2013 |
| JP | 5429928 | 2/2014 |
| JP | 5429929 | 2/2014 |
| JP | 5568801 | 8/2014 |
| JP | 5608864 | 10/2014 |
| JP | 5660605 | 1/2015 |
| JP | 5923677 | 5/2016 |
| KR | 10-2008-0054568 | 6/2008 |
| KR | 10-2015-0099600 | 8/2015 |
| WO | 1995/021688 | 8/1995 |
| WO | 1998/054397 | 12/1998 |
| WO | 2000/027544 | 5/2000 |
| WO | 2010/113489 | 10/2010 |

OTHER PUBLICATIONS

Vietnamese Office Action with English translation, dated Aug. 5, 2019, corresponding to VN Patent Application No. 1-2017-04087, 4 pp.
Search Report dated Jun. 14, 2016, corresponding to International Application No. PCT/JP2016/058728 (filed Mar. 18, 2016), parent of the present application, 3 pp.
Chinese Office Action, dated Mar. 29, 2018, in Chinese Patent Application No. 201680012815.9, a related application, 5 pp.
Notice of Allowance, dated Dec. 18, 2017, for Korean Application No. 10-2017-7023689, a related application, 2 pp.
International Preliminary Report on Patentability, dated Sep. 20, 2018, corresponding to International Application No. PCT/JP2016/058728 (filed Mar. 18, 2016), parent of the present application, 7 pp.

* cited by examiner

*Primary Examiner* — Brieann R Johnston
(74) *Attorney, Agent, or Firm* — Leydig, Voit & Mayer, Ltd.

(57) ABSTRACT

A coating liquid composition comprises a resin component, a first solvent having a solubility parameter lower than 23.5 $(MPa)^{0.5}$, carbon dioxide, and a second solvent having a solubility parameter of 23.5 $(MPa)^{0.5}$ to 40 $(MPa)^{0.5}$. An average boiling point $bp_1$ of the first solvent and an average boiling point $bp_2$ of the second solvent satisfy a relationship of $bp_1 - bp_2 > 0$.

11 Claims, 2 Drawing Sheets

COATING FLUID COMPOSITION, METHOD FOR FORMING COATING FILM, PROCESS FOR PRODUCING COATING FLUID COMPOSITION, DEVICE FOR PRODUCING COATING FLUID COMPOSITION, AND COMPOSITION FOR PREPARING COATING FLUID COMPOSITION CONTAINING CARBON DIOXIDE

CROSS-REFERENCE TO RELATED APPLICATIONS

This application is a U.S. National Stage Application filed under 35 U.S.C. § 371 of International Application No. PCT/JP2016/058728, filed Mar. 18, 2016, which claims the benefit of Japanese Application No. 2016-045654, filed Mar. 9, 2016. Both of these applications are hereby incorporated by reference in their entireties.

TECHNICAL FIELD

The present invention relates to a coating liquid composition containing carbon dioxide, and the like.

BACKGROUND ART

As a method for coating a target with an ink or a paint, a method in which a coating liquid composition prepared by mixing the ink or the paint with carbon dioxide is sprayed onto the target is known. In this method, the carbon dioxide works as a diluent, and the viscosity of the ink or the paint is lowered to a sprayable level.

Various techniques relating to such coating using carbon dioxide have been developed as described in, for example, Patent Literatures 1 to 6.

CITATION LIST

Patent Literature

Patent Literature 1: Japanese Patent No. 4538625
Patent Literature 2: Japanese Patent No. 5429928
Patent Literature 3: Japanese Patent No. 5429929
Patent Literature 4: Japanese Patent No. 5660605
Patent Literature 5: Japanese Patent No. 5568801
Patent Literature 6: Japanese Patent No. 5608864

SUMMARY OF INVENTION

Technical Problem

In these conventional techniques, however, the coating liquid composition has not been sufficiently examined. Therefore, a resin component is precipitated in the coating liquid composition, which often causes clogging of a line through which the coating liquid composition passes. Moreover, a coating formed by spraying the coating liquid composition does not have a sufficient leveling property.

The present invention was devised in consideration of the above-described problems, and aims at providing a coating liquid composition and the like with which precipitation of a resin component can be reduced and with which a coating having a good leveling property can be formed, even when carbon dioxide is used as a diluent.

Solution to Problem

As a result of earnest studies, the present inventors have found the following: At 10 MPa and 20° C., carbon dioxide has a SP value (a solubility parameter) of about 15 $(MPa)^{0.5}$ while a resin has a SP value of, for example, about 17 to 25 $(MPa)^{0.5}$ and a true solvent has a SP value of, for example, about 16 to 23.3 $(MPa)^{0.5}$. Therefore, when carbon dioxide is mixed with a mixture of a resin and a true solvent, a SP value of the resultant mixed solvent tends to be lower than that of the resin, which tends to cause precipitation of the resin.

A coating liquid composition according to one aspect of the present invention comprises a resin component; a first solvent having a solubility parameter lower than 23.5 $(MPa)^{0.5}$; carbon dioxide; and a second solvent having a solubility parameter of 23.5 $(MPa)^{0.5}$ to 40 $(MPa)^{0.5}$, and an average boiling point $bp_1$ of the first solvent and an average boiling point $bp_2$ of the second solvent satisfy a relationship of $bp_1-bp_2>0$.

In this manner, since the second solvent having a high SP value is mixed in addition to the first solvent, even when carbon dioxide having a low SP value is mixed, precipitation of the resin component can be reduced, and spraying can be suitably performed. Moreover, according to this coating liquid composition, a coating having a good leveling property can be formed. The reason behind this is not exactly clear but is presumed as follows: If $bp_1-bp_2<0$, in a process of forming a coating by removing the solvents from a liquid membrane, the first solvent that can easily dissolve the resin component is removed from the liquid membrane first, and much of the second solvent that is difficult to dissolve the resin component remains in the liquid membrane. Accordingly, in the process of removing the solvents, the resin component is unevenly precipitated in the liquid membrane mainly containing the second solvent, which makes it difficult to sufficiently obtain a surface smoothing effect. On the contrary, if $bp_1-bp_2>0$, the second solvent that is difficult to dissolve the resin component is removed from the liquid membrane first and the first solvent that can easily dissolve the resin component remains in the liquid membrane in the above-described process, and therefore, the uneven precipitation of the resin component otherwise caused in the process of removing the solvents can be inhibited, and the surface smoothing effect can be sufficiently obtained.

Here, an amount of the carbon dioxide can be 23.5% by mass or more with respect to a total amount of the coating liquid composition. Thus, when the coating liquid composition is sprayed, finer mist is formed, and hence, a coating having a better leveling property can be formed.

Moreover, an amount of the second solvent can be 0.5% by mass to 95% by mass, can be 1.0% by mass to 84% by mass, or can be 1.9% by mass to 44.5% by mass with respect to a total amount of the carbon dioxide and the second solvent. Thus, the SP values of the respective solvent components in the coating liquid composition can be balanced in magnitude, and hence, the precipitation of the resin component in the coating liquid composition can be reduced.

A method for forming a coating according to one aspect of the present invention comprises a step of spraying such a coating liquid composition from a nozzle onto a target to form a liquid membrane; and a step of solidifying the liquid membrane to form a coating.

A method for producing a coating liquid composition according to one aspect of the present invention comprises a step of mixing a resin component, a first solvent having a solubility parameter lower than 23.5 $(MPa)^{0.5}$, carbon dioxide, and a second solvent having a solubility parameter of 23.5 $(MPa)^{0.5}$ to 40 $(MPa)^{0.5}$ to obtain a coating liquid composition, and an average boiling point $bp_1$ of the first solvent and an average boiling point $bp_2$ of the second solvent satisfy a relationship of $bp_1-bp_2>0$.

Here, the step of mixing can include a step of mixing the carbon dioxide and the second solvent; and a step of mixing a mixture of the resin component and the first solvent with the mixture of the carbon dioxide and the second solvent. Accordingly, since carbon dioxide having a low SP value and the second solvent having a high SP value are mixed first, and the resin component is added when the SP value of the mixed solvent has become more even, the precipitation of the resin component can be reduced more.

Moreover, the step of mixing can include a step of mixing the carbon dioxide with a mixture of the resin component, the first solvent and the second solvent.

An apparatus for producing a coating liquid composition according to one aspect of the present invention comprises a mixing section for mixing a resin component, a first solvent having a solubility parameter lower than 23.5 $(MPa)^{0.5}$, carbon dioxide, and a second solvent having a solubility parameter of 23.5 $(MPa)^{0.5}$ to 40 $(MPa)^{0.5}$ to give a coating liquid composition, and an average boiling point $bp_1$ of the first solvent and an average boiling point $bp_2$ of the second solvent satisfy a relationship of $bp_1-bp_2>0$.

A composition for preparation of a carbon dioxide-containing coating liquid composition according to one aspect of the present invention comprises a resin component; a first solvent having a solubility parameter lower than 23.5 $(MPa)^{0.5}$; and a second solvent having a solubility parameter of 23.5 $(MPa)^{0.5}$ to 40 $(MPa)^{0.5}$, and an average boiling point $bp_1$ of the first solvent and an average boiling point $bp_2$ of the second solvent satisfy a relationship of $bp_1-bp_2>0$.

Advantageous Effects of Invention

According to the present invention, even when carbon dioxide is used as a diluent, precipitation of a resin component can be reduced and a coating having a good leveling property can be formed.

DESCRIPTION OF EMBODIMENTS

Figure 1:
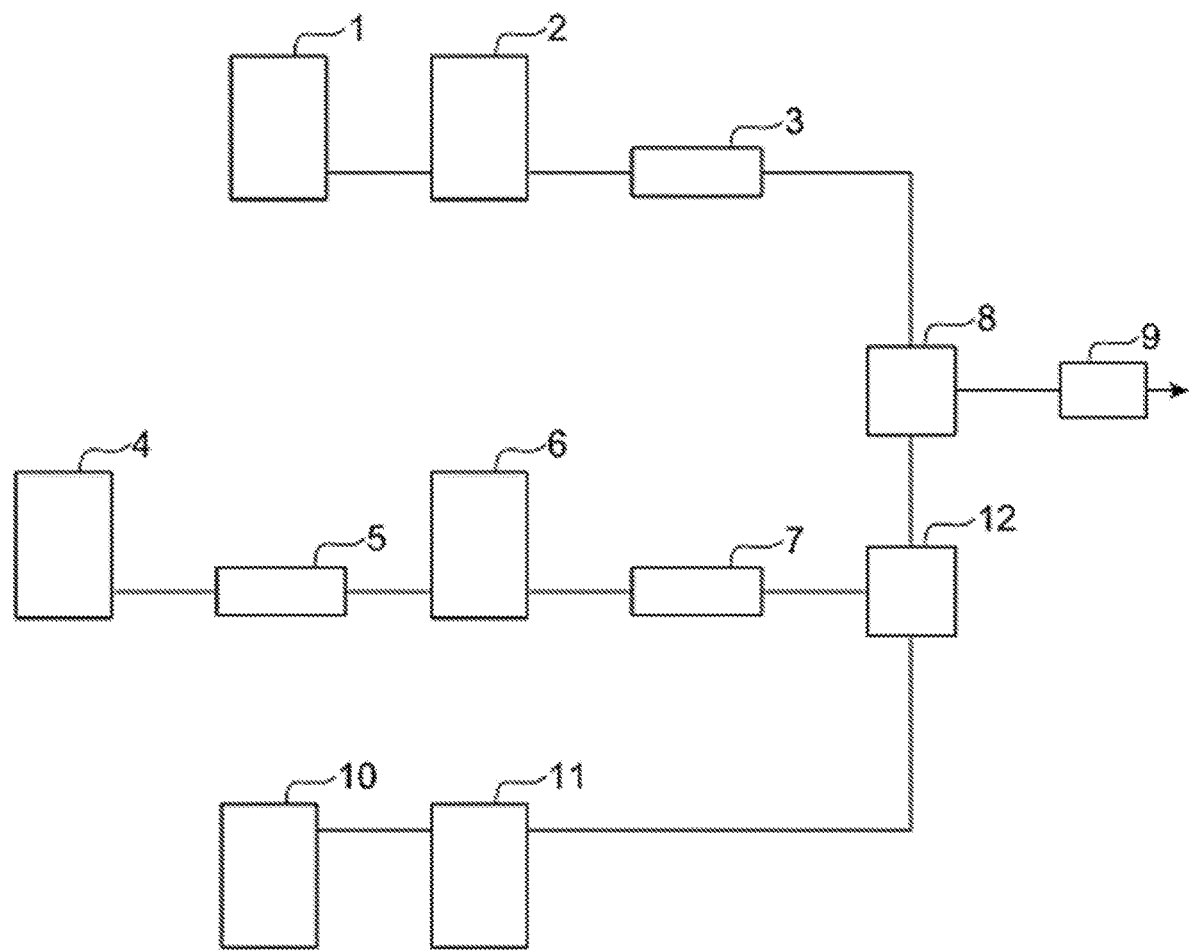
FIG. 1 is a block diagram illustrating the structure of a carbon dioxide coating apparatus employing a three-component continuous mixing system.

Now, embodiments for practicing the present invention will be described with reference to the accompanying drawings. It is noted that identical reference numerals are used to refer to identical elements in these drawings to avoid redundant description.

In the present embodiments, the solubility parameter refers to a Hilderbrand solubility parameter. The solubility parameter (hereinafter referred to as the SP value) is a thermodynamic parameter indicating the degree of affinity between substances, and it is known that substances having similar SP values tend to be easily dissolved in each other.

A coating liquid composition according to the present invention contains a resin component, a first solvent, carbon dioxide and a second solvent. These components will now be described.

<Resin Component>

The resin component is not particularly limited as long as it is a usually used resin, and examples include epoxy resins (about 22), acrylic resins (about 19), acrylic urethane resins (about 17 to 22), polyester resins (about 22), acrylic silicon resins (about 17 to 22), alkyd resins (about 17 to 25), UV curable resins (about 17 to 23), vinyl chloride acetate resins (about 19 to 22), styrene-butadiene rubbers (about 17 to 18), polyester urethane resins (about 19 to 21), styrene acrylic resins (about 19 to 21), amino resins (about 19 to 21), polyurethane resins (about 21), phenol resins (about 23), vinyl chloride resins (about 19 to 22), nitrocellulose resins (about 22 to 24), cellulose acetate butyrate resins (about 20), styrene resins (about 17 to 21) and melamine-urea resins (about 19 to 21). These can be used either singly or as a mixture of two or more. The resin component may be a one-component curable resin or a two-component curable resin, and may be an active energy ray (such as UV)-curable resin. The numerical values in brackets above are SP values in $(MPa)^{0.5}$.

The SP value of the resin component can be 17 $(MPa)^{0.5}$ or more, 18 $(MPa)^{0.5}$ or more, or 19 $(MPa)^{0.5}$ or more, and can be 25 $(MPa)^{0.5}$ or less, 24 $(MPa)^{0.5}$ or less, or 23.5 $(MPa)^{0.5}$ or less.

The SP value of the resin component can be obtained as follows: After dissolving the resin in a good solvent A, a poor solvent H having a higher SP value than the good solvent and a poor solvent L having a lower SP value than the good solvent are separately added thereto in a dropwise manner, and the amount of each of the poor solvents it required for precipitating the resin and causing the resultant solution to become cloudy is recorded. Let $\delta_A$ be the SP value of the good solvent A, $\delta_H$ be the SP value of the poor solvent H and $\delta_L$ be the SP value of the poor solvent L, and let $\phi_A$, $\phi_H$ and $\phi_L$, be the volume fractions of the good solvent A, the poor solvent H and the poor solvent L at the point when solution became cloudy, respectively. The SP values $\delta_{good\ solvent\ A+poor\ solvent\ H}$ and $\delta_{good\ solvent\ A+poor\ solvent\ L}$ of mixed solvents at two cloud points can each be expressed as a volume average of the SP values, and the following equations hold:

$$\delta_{good\ solvent\ A+poor\ solvent\ H}=(\phi_A\cdot\delta_A^2+\phi_H\cdot\delta_H^2)^{0.5}$$

$$\delta_{good\ solvent\ A+poor\ solvent\ L}=(\phi_A\cdot\delta_A^2+\phi_L\cdot\delta_L^2)^{0.5}$$

Accordingly, the SP value $SP_R$ of the resin is expressed as follows:

$$SP_R=((V_{good\ solvent\ A+poor\ solvent\ H}\cdot\delta_{good\ solvent\ A+poor\ solvent\ H}^2+V_{good\ solvent\ A+poor\ solvent\ L}\cdot\delta_{good\ solvent\ A+poor\ solvent\ L}^2)/(V_{good\ solvent\ A+poor\ solvent\ H}+V_{good\ solvent\ A+poor\ solvent\ L}))^{0.5}$$

Here, $V_{good\ solvent\ A+poor\ solvent\ H}$ and $V_{good\ solvent\ A+poor\ solvent\ L}$ refer to average molar volumes of the mixed solvents at the cloud points, and for example, the former is obtained by the following equation:

$$1/V_{good\ solvent\ A+poor\ solvent\ H}=\phi_A/V_A+\phi_H/V_H$$

Here, $V_A$ and $V_H$ respectively represent the molar volumes of the good solvent A and the poor solvent H.

<First Solvent>

The first solvent is a solvent having a SP value lower than 23.5 $(MPa)^{0.5}$, and is a true solvent capable of dissolving the resin component. Examples of the first solvent include methyl isobutyl ketone (17.2), 3-methoxybutyl acetate (20.5), propylene glycol monomethyl ether acetate (18.7), Solvesso 100 (S100) (trade name, manufactured by Tonen General Sekiyu K.K.) (17.6), Solvesso 150 (S150) (trade name, manufactured by Tonen General Sekiyu K.K.) (17.4), ethyl diglycol acetate (18.5), n-butanol (23.3), diisobutyl ketone (16), ethyl acetate (18.6), butyl acetate (17), toluene (18.2), isobutyl acetate (17), MEK (methyl ethyl ketone) (19), PGM (propylene glycol monomethyl ether) (20.7), xylene (18), isobutanol (22.1), diacetone alcohol (20.8), cyclohexanol (23.3), isophorone (18.6), ethyl-3-ethoxypropionate (18.9), diethylene glycol monobutyl ether (20.5), methyl propylene diglycol (20.1), isoamyl acetate (16), N-methyl-2-pyrolidone (23.2), isopropyl acetate (17.6), methyl amyl ketone (17.8), methyl diglycol (22.1), methyl cellosolve (24.6), cellosolve acetate (19.3), diethylene glycol monoethyl ether acetate (19.5), propylene glycol monoethyl ether acetate (18.7), acetone (20.3), cyclohexane (16.8) and ethyl benzene (18). The numerical values in brackets above are SP values in $(MPa)^{0.5}$. The first solvent may be a mixture of solvents each having a SP value lower than 23.5 $(MPa)^{0.5}$.

The amount of the first solvent is not particularly limited as long as the resin component can be dissolved therein, and can be 25 parts by mass to 10000 parts by mass, 25 parts by mass to 1000 parts by mass, or 87 parts by mass to 424 parts by mass with respect to 100 parts by mass of the resin component.

An average boiling point $bp_1$ of the first solvent can be 66° C. to 400° C., 100° C. to 250° C., or 135.7° C. to 167.8° C. The $bp_1$ of 66° C. to 400° C. is suitable for forming a coating because the first solvent also rapidly volatilizes after the second solvent volatizes from a coated liquid membrane formed by spraying the coating liquid composition as describe later.

It is noted that the term "average boiling point" of a solvent herein refers to a sum of values each obtained by multiplying the boiling point of each solvent by a mass fraction thereof. Specifically, for example, an average boiling point T of a mixed solvent of a solvent a (having a mass Ma and a boiling point Ta) and a solvent b (having a mass Mb and a boiling point Tb) can be obtained by an equation $T=Ta \times Ma/(Ma+Mb)+Tb \times Mb/(Ma+Mb)$.

<Carbon Dioxide>

Carbon dioxide can be present in the coating liquid composition usually in the form of a liquid or a supercritical fluid. Carbon dioxide is present in the form of a liquid at a temperature of 20° C. and a pressure of 10 MPa, and has a SP value of about 15 $(MPa)^{0.5}$. On the other hand, the SP value of carbon dioxide in the form of a supercritical fluid is lower than this SP value, and the SP value of carbon dioxide in the form of a gas is even lower. From the viewpoint of keeping the SP values of the components of the coating liquid composition balanced in magnitude, the carbon dioxide is preferably a liquid. Specifically, when the carbon dioxide is a liquid, the SP value of the mixed solvent in the coating liquid composition is not too much lower than the SP value of the resin component, and hence, the precipitation of the resin component can be reduced. Moreover, when the coating liquid composition is sprayed and released from a compressed state, the compressed carbon dioxide instantly vaporizes, and its volume is greatly expanded. Owing to force generated here, the coating liquid composition turns into a fine mist.

The amount of the carbon dioxide can be 23.5% by mass or more, 28% by mass or more, 40% by mass or more, or 70% by mass or more with respect to the whole amount of the coating liquid composition. When the amount of the carbon dioxide is 23.5% by mass or more, the coating liquid composition turns into a finer mist when sprayed, and hence, a coating having a better leveling property can be formed.

<Second Solvent>

The second solvent has a SP value of 23.5 $(MPa)^{0.5}$ to 40 $(MPa)^{0.5}$. Examples of the second solvent include formamide (39.3), hydrazine (37.3), glycerin (33.8), N-methylformamide (32.9), 1,4-diformylpiperazine (31.5), ethylene cyanohydrin (31.1), malononitrile (30.9), 2-pyrrolidine (30.1), ethylene carbonate (30.1), methylacetamide (29.9), ethylene glycol (29.9), methanol (29.7), dimethyl sulfoxide (29.7), phenol (29.3), 1,4-diacetyl piperazine (28), maleic anhydride (27.8), 2-piperidone (27.8), formic acid (27.6), methyl ethyl sulfone (27.4), pyrone (27.4), tetramethylene sulfone (27.4), propiolactone (27.2), propylene carbonate (27.2), N-nitrosodimethylamine (26.8), N-formylmorpholine (26.6), 3-methylsulforan (26.4), nitromethane (26), ethanol (26), ε-caprolactam (26), propylene glycol (25.8), butyrolactone (25.8), chloroacetonitrile (25.8), methyl propyl sulfone (25.6), furfuryl alcohol (25.6), phenyl hydrazine (25.6), dimethyl phosphite (25.6), 2-methoxyethanol (25.4), diethyl sulfone (25.4), ethylene diamine (25.2), ethylacetamide (25.2), 2-chloroethanol (25), benzyl alcohol (24.8), 4-ethyl-1,3-dioxolane-2-on (24.8), bis(2-ethylhexyl) phthalate (24.8), dimethylformamide (24.8), diethylene glycol (24.8), 1,4-butanediol (24.8), tetrahydro-2,4-dimethylthiophene 1,1-dioxide (24.6), acrylic acid (24.6), 1-propanol (24.3), acetonitrile (24.3), allyl alcohol (24.1), 4-acetylmorpholine (23.7), 1,3-butanediol (23.7), formylpiperidine (23.5), pentanediol (23.5), isopropanol (23.5), ethylene glycol monophenyl ether (23.5) and ethyl cellosolve (23.5). The numerical values in brackets above are SP values in $(MPa)^{0.5}$. The second solvent may be a mixed solvent of solvents each having a SP value of 23.5 $(MPa)^{0.5}$ to 40 $(MPa)^{0.5}$. The SP value of the second solvent can be 24 $(MPa)^{0.5}$ or more, or 25 $(MPa)^{0.5}$ or more.

Among these, the second solvent is preferably formamide, methanol, dimethyl sulfoxide, ethanol, propylene glycol, butyrolactone, dimethylformamide, isopropanol, acetonitrile, or a mixed solvent of these in any combination.

If a two-component curable resin is used as the resin component, an aprotic solvent is preferably used as the second solvent from the viewpoint of inhibiting a reaction with the resin component. An example of the aprotic solvent includes at least one selected from the group consisting of 1,4-diformylpiperazine, malononitrile, ethylene carbonate, dimethyl sulfoxide, 1,4-diacetylpiperazine, methyl ethyl sulfone, pyrone, tetramethylsulfone, propiolactone, propylene carbonate, N-nitrosodimethylamine, N-formylmorpholine, 3-methylsulfolane, nitromethane, butyrolactone, chloroacetonitrile, methyl propyl sulfone, diethyl sulfone, 4-ethyl-1,3-dioxolane-2-on, bis(2-ethylhexyl) phthalate, dimethylformamide, tetrahydro-2,4-dimethylthiophene 1,1-dioxide, acetonitrile, 4-acetylmorpholine and formylpiperidine. Among these, dimethyl sulfoxide, butyrolactone, dimethylformamide, acetonitrile or a mixed solvent of these in any combination is preferred.

From the viewpoint of keeping the SP values of the components of the coating liquid composition balanced in magnitude, the amount of the second solvent is usually 0.5% by mass to 95% by mass, can be 1.0% by mass to 84% by mass, or 1.9% by mass to 44.5% by mass with respect to the total amount of the carbon dioxide and the second solvent. When the amount of the second solvent is 0.5% by mass to 95% by mass, the SP value of a mixed solvent of the first solvent, the carbon dioxide and the second solvent contained in the coating liquid composition is close to the SP value of the resin component, and hence, the precipitation of the resin component can be reduced.

An average boiling point $bp_2$ of the second solvent can be 60° C. to 385° C., 62° C. to 210° C., or 65° C. to 167.8° C. When the $bp_2$ is 60° C. to 385° C., the second solvent rapidly volatilizes from the coated liquid membrane formed by spraying the coating liquid composition as describe later, and hence, the precipitation of the resin component in the coated liquid membrane can be reduced, resulting in forming a coating having a better leveling property.

The average boiling point $bp_1$ of the first solvent and the average boiling point $bp_2$ of the second solvent satisfy a relationship of $bp_1-bp_2>0$. Thus, a coating having higher flatness can be obtained. The reason behind this is not clear, but is presumed as follows: When the coating liquid composition is sprayed, the carbon dioxide instantly vaporizes to form a fine mist, and the mist adheres to a target to form a coated liquid membrane thereon. The resultant coated liquid membrane contains, in addition to the resin component, the first solvent and the second solvent having a high SP value. Thereafter, these solvents are removed from the liquid membrane, and thus, a solidified coating is obtained. During the removal of the solvents, the solvent having a lower boiling point, namely, higher volatility, is priorly removed. Therefore, if $bp_1-bp_2<0$, namely, $bp_1<bp_2$, the first solvent that has a SP value close to the SP value of the resin component and easily dissolves the resin component is priorly removed from the liquid membrane. Accordingly, during the drying process performed thereafter, the resin component is unevenly precipitated in the liquid membrane containing, as a principal component, the second solvent that has a high SP value and is difficult to dissolve the resin component, resulting in a tendency to degrade surface flatness of the resultant coating. On the contrary, if the relationship of $bp_1-bp_2>0$ is satisfied, namely, if $bp_1>bp_2$, the second solvent that has a high SP value and is difficult to dissolve the resin component is priorly removed from the liquid membrane. Accordingly, during the drying process performed thereafter, the uneven precipitation of the resin component is inhibited in the liquid membrane containing, as a principal component, the first solvent that has the SP value close to the SP value of the resin component and easily dissolves the resin component, and hence, a coating having a good leveling property can be formed.

Bpi and the $bp_2$ can satisfy a relationship of $bp_1-bp_2\geq2$, can satisfy a relationship of $bp_1-bp_2\geq5$, can satisfy a relationship of $bp_1-bp_2\geq10$, or can satisfy a relationship of $bp_1-bp_2\geq30$.

The coating liquid composition can contain various additives in addition to the above-described components as long as the SP value of the mixed solvent in the coating liquid composition is not affected. For example, the composition may contain any of additives usually added to a paint or an ink, such as co-solvents, diluents, pigments, pigment dispersing agents, UV absorbers, light stabilizers, leveling agents, tackifiers, rheology control agents and polymerization initiators. When a two-component curable resin is used as the resin component, a curing agent can be contained as an additive. The curing agent for a two-component curable resin is not particularly limited, and curing agents generally used as curing agents for a two-component curable resin, such as isocyanate, can be used.

Figure 2:
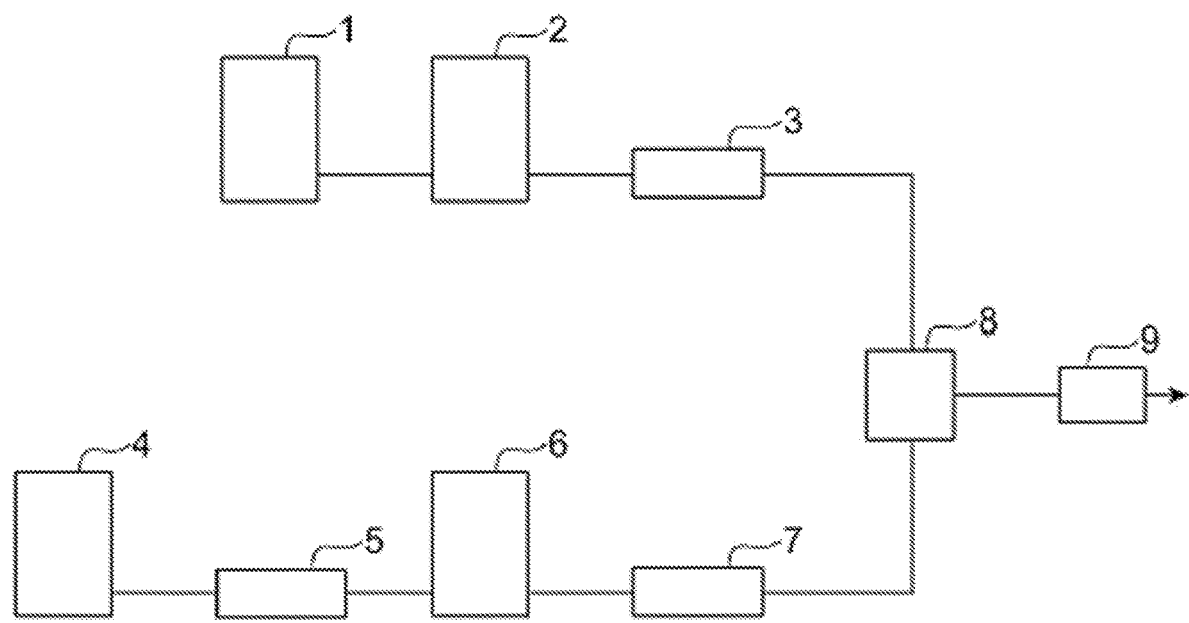
FIG. 2 is a block diagram illustrating the structure of a carbon dioxide coating apparatus employing a two-component continuous mixing system.

According to the coating liquid composition described so far, since the second solvent having a high SP value is mixed in addition to the first solvent which is a true solvent, the precipitation of the resin component can be reduced and the composition can be suitably sprayed even when the carbon dioxide having a low SP value is mixed. Moreover, according to the coating liquid composition, the second solvent priorly volatilizes from the coated liquid membrane formed by spraying, and hence, even when the carbon dioxide vaporizes during the spraying, the precipitation of the resin component can be reduced, and hence a coating having a good leveling property can be formed.

Subsequently, a method for producing this coating liquid composition will be described. The coating liquid composition is obtained by mixing the resin component, the first solvent, carbon dioxide and the second solvent. An example of a mixing method includes a line blending method using an in-line mixer. The order of mixing is not particularly limited, but the following order is preferred.

<Three-Component Continuous Mixing Method>

This method includes a step of mixing carbon dioxide and the second solvent to obtain a mixture, and a step of mixing the mixture with a mixture of the resin component and the first solvent.

In the present embodiment, a carbon dioxide coating apparatus employing a three-component continuous mixing system as illustrated in FIG. 1 can be used. The carbon dioxide stored in a $CO_2$ cylinder 4 is cooled to be liquefied by a $CO_2$ condenser 5, compressed to a prescribed pressure by a high-pressure $CO_2$ pump 6, heated to a prescribed temperature by a $CO_2$ heater 7, and then supplied to a first mixer 12. The second solvent stored in a solvent tank 10 is compressed to a prescribed pressure by a high-pressure solvent pump 11, and then supplied to the first mixer 12. As the first mixer 12, for example, an in-line mixer can be used.

Moreover, a mixture of the resin component and the first solvent stored in a paint tank 1 is compressed to a prescribed pressure by a high-pressure paint pump 2, heated to a prescribed temperature by a paint heater 3, and then supplied to a second mixer 8. As the second mixer 8, for example, an in-line mixer can be used. The mixture stored in the paint tank 1 can contain any of the aforementioned additives.

Specifically, the carbon dioxide and the second solvent are mixed in the first mixer 12, and subsequently, the thus obtained mixture is mixed with the mixture of the resin component and the first solvent in the second mixer 8 to obtain the coating liquid composition. In the present embodiment, since the carbon dioxide having a low SP value and the second solvent having a high SP value are priorly mixed, the precipitation of the resin component in the mixing of the resin component and the carbon dioxide can be easily reduced.

The coating liquid composition obtained using the second mixer 8 is sprayed onto a coating target from a spray gun 9 having a nozzle or an orifice by the method described later, so that a coating can be formed. A retention time of the coating liquid composition from the mixing of the resin component and the carbon dioxide (namely, the preparation of the coating liquid composition) to the spraying is preferably 60 seconds or less, and is preferably 5 seconds or less. The retention time may be adjusted by changing the capacity of a tube connecting the second mixer 8 to the spray gun 9.

According to the method of the present embodiment, since carbon dioxide having a low SP value and the second solvent having a high SP value are mixed first, and the resin component is mixed when the SP value of the mixed solvent has become more even, the precipitation of the resin component in the continuous carbon dioxide coating apparatus can be more effectively reduced.

<Two-Component Continuous Mixing Method>

Subsequently, another mixing method will be described. The method according to a second embodiment includes a step of mixing carbon dioxide with a mixture of the resin component, the first solvent and the second solvent.

In the present embodiment, a carbon dioxide coating apparatus employing a two-component continuous mixing system as illustrated in FIG. 2 can be used. A mixture of the resin component, the first solvent and the second solvent (namely, a composition for preparation of the coating liquid composition) stored in a paint tank 1 is compressed to a prescribed pressure by a high-pressure paint pump 2, heated to a prescribed temperature by a paint heater 3, and then supplied to a second mixer 8. On the other hand, carbon dioxide stored in a $CO_2$ cylinder 4 is cooled to be liquefied by a $CO_2$ condenser 5, compressed to a prescribed pressure by a high-pressure $CO_2$ pump 6, heated to a prescribed temperature by a $CO_2$ heater 7, and then supplied to the second mixer 8. The mixture held in the paint tank 1 can contain any of the aforementioned additives.

The resin component, the first solvent, the carbon dioxide and the second solvent are mixed in the second mixer 8 to obtain the coating liquid composition. The coating liquid composition is sprayed onto a coating target by a spray gun 9 in the same manner as described above. Other conditions and the like can be set in the same manner as in the three-component continuous mixing method.

A retention time of the coating liquid composition from the mixture of the resin component and the carbon dioxide (namely, the preparation of the coating liquid composition) to the spraying is preferably 600 seconds or less. The retention time may be adjusted by changing the capacity of a tube connecting the second mixer 8 to the spray gun 9. In this method, by increasing the retention time, the precipitated resin, if any, is dissolved again before reaching the nozzle of the spray gun 9, and thus, clogging by the precipitation is less likely to occur.

According to the method of the present embodiment, since the carbon dioxide is mixed with the precedently prepared mixture of the resin component, the first solvent and the second solvent, the precipitation of the resin component in the continuous carbon dioxide coating apparatus can be more effectively reduced.

Furthermore, a method for forming a coating using the thus produced coating liquid composition will now be described. The coating includes a step of spraying the coating liquid composition from a nozzle onto a target to form a liquid membrane, and a step of solidifying the liquid membrane to form a coating.

In FIGS. 1 and 2, the coating liquid composition obtained using the second mixer 8 is in a compressed state, and hence can be sprayed into the air through the spray gun 9. When the coating liquid composition is sprayed, the carbon dioxide in a compressed state instantly vaporizes, and its volume is greatly expanded. Owing to force generated here, the coating liquid composition turns into a fine mist. When the mist is brought into contact with a coating target, a coated liquid membrane is formed on the surface of the coating target. The coated liquid membrane contains the mixed solvent of the first solvent and the second solvent, and the resin component dissolved in the mixed solvent. Thereafter, the second solvent volatilizes, and the liquid membrane containing the first solvent and the resin component dissolved therein is solidified by, for example, drying, heating or curing with an active energy ray such as UV to form a coating. In this manner, coating, printing, or the like can be performed on the coating target.

The temperature of the coating liquid composition to be sprayed is preferably 0° C. to 60° C., and more preferably 10° C. to 30° C. When using a two-component curable resin, a usable time (pot life) of the coating liquid composition tends to be shorter if the temperature exceeds 60° C. A heat exchanger to be used for adjusting the temperature of the coating liquid composition may be provided downstream of the second mixer 8, but instead of providing it downstream of the second mixer 8, it is preferably provided at the second mixer 8, or upstream of the second mixer 8. Specifically, by providing a heat exchanger on a line before mixing the resin component with the carbon dioxide, precipitation of the resin component in the heat exchanger can be reduced. When the temperature of the coating liquid composition is 10° C. to 30° C., there is no need to provide the $CO_2$ heater 7 or the paint heater 3, and there is no need to use a heat exchanger for adjusting the temperature of the coating liquid composition.

The pressure of the coating liquid composition to be sprayed is preferably 2 MPa or more, and more preferably 2 MPa to 15 MPa.

According to the method of the present embodiment, a nozzle disposed in the spray gun 9 is not clogged, and a coating having a good leveling property can be formed.

The preferable embodiments of the present invention have been described in detail so far, but it is noted that the present invention is not limited to these embodiments and can be practiced in various modified aspects. For example, although the second solvent is not contained in the paint tank 1 in the above-described three-component continuous mixing method, a part of the second solvent may be precedently mixed in the paint tank.

EXAMPLES

Now, the present invention will be specifically described with reference to examples, but it is noted that the present invention is not limited to the following examples.

Examples 1 to 69

Resin compositions, solvents (a solvent A and a solvent B), carbon dioxide and additives were mixed in ratios as shown in Tables 4 to 11. It is noted that the resin compositions used in examples and comparative examples are shown in Table 1, the additives are shown in Table 2, and the solvents are shown in Table 3. In Table 1, NV means a mass ratio of a non-volatile component (namely, a resin component) of the corresponding resin composition, and if NV is not 100%, the resin composition contains a first solvent component such as butyl acetate for dissolving the resin component.

TABLE 1

| Manufacturer | Material | Model No. | SP Value $(MPa)^{0.5}$ | NV (%) | Solvent Component |
|---|---|---|---|---|---|
| Hitachi Chemical Co., Ltd. | Acrylic Resin | 3546-3 | 21 | 50 | Toluene/Butyl Acetate = 42/8 |
| | Acrylic Resin | 3204EB1 | 20.8 | 45 | Butyl Acetate/ Ethyl Acetate = 51/49 |
| DIC | Acrylic Resin | A859B | 21.2 | 75 | Butyl Acetate |

TABLE 1-continued

| Manufacturer | Material | Model No. | SP Value (MPa)$^{0.5}$ | NV (%) | Solvent Component |
|---|---|---|---|---|---|
| Corporation | Acrylic Resin | BL616BA | 20.4 | 45 | Isobutyl Acetate |
| | Tertiary Amine-containing Acrylic Resin | BZ1160BA | 22 | 44 | Butyl Acetate |
| | Acrylic Resin | WGU-337 | 21.2 | 70 | Butyl Acetate |
| Mitsubishi Rayon Co., Ltd. | UV-curable Oligomer | UK9050 | 20.6 | 75 | Butyl Acetate |
| Toagosei Co., Ltd. | UV-curable Trifunctionl Monomer | M350 | 19.9 | 100 | |
| | UV-curable Polyfunctional Monomer | M402 | 19.9 | 100 | |
| Eastman Chemical Co. | Cellulose Acetate Butyrate Resin | CAB551-0.2 | 19.8 | 100 | |
| Nissin Chemical Co., Ltd. | Vinyl Chloride Acetate Resin | Solbin A | 19.2 | 100 | |
| Toyobo Co., Ltd. | Polyester Urethane Resin | UR-4800 | 20.6 | 32 | MEK/Toluene = 50/50 |

TABLE 2

| | Manufacturer | Trade Name |
|---|---|---|
| Additive | Nitto Kasei Co., Ltd. | Neostan U-100 |
| | New Japan Chemical Co., Ltd. | Sanso Cizer DINA |
| | BYK Chemie | BYK333 |
| | | BYK355 |
| | BASF | Ti400 |
| | | Ti123 |
| | | EFKA4400 |
| | Ajinomoto Fine-Techno Co. Inc. | Ajisper 881 |
| | Lubrizol Corporation | Solsperse 32500 |
| | BYK Chemie | BYK166 |
| | BASF | IRGACURE184 |
| Pigment | Ishihara Sangyo Kaisha Ltd. | CR97 |
| | Mitsubishi Carbon Black | MA100 |
| | Sanyo Color Works, Ltd. | Cyanine Blue G-314 |
| | Hoechst AG | Hostaperm Violet RINF |
| | DIC | Fastogen Super Red 7061B |
| | BASF | Sicotrans Red L2817 |
| | | DPP Rubine FTX |
| | | DPP Scarlet EK |
| | | 2GLTE |
| | | 5GLT |
| | | EFKA6745 |

TABLE 3

| | Solvent | SP Value (MPa)$^{0.5}$ | Specific Gravity |
|---|---|---|---|
| Solvent A (First Solvent) | MIBK (Methyl Isobutyl Ketone) | 17.2 | — |
| | Methoxybutyl Acetate | 20.5 | — |
| | PMA (Propylene Glycol Monomethyl Ether Acetate) | 18.7 | — |
| | S100 (manufactured by Tonen General Sekiyu K.K.) | 17.6 | — |
| | S150 (manufactured by Tonen General Sekiyu K.K.) | 17.4 | — |
| | EDGAc (Ethy Diglycol Acetate) | 18.5 | — |
| | n-Butanol | 23.3 | — |
| | DIBK (Diisobutyl Ketone) | 16 | — |
| | Toluene | 18.2 | — |
| | Butyl Acetate | 17 | — |
| | Ethyl Acetate | 18.6 | — |
| | Isobutyl Acetate | 17 | — |
| | MEK (Methyl Ethyl Ketone) | 19 | — |
| Solvent B (Second Solvent) | Formamide | 39.3 | 1.13 |
| | Butyrolactone | 25.8 | 1.13 |
| | Propylene Glycol | 25.8 | 1.04 |
| | Ethanol | 26.0 | 0.79 |
| | Dimethylformamide | 24.8 | 0.94 |
| | Acetonitrile | 24.3 | 0.79 |
| | IPA (Isopropyl Alcohol) | 23.5 | 0.78 |
| | Methanol | 29.7 | 0.79 |
| | DMSO (Dimethyl Sulfoxide) | 29.7 | 1.10 |

TABLE 4

| | | Example | | | | | | | |
|---|---|---|---|---|---|---|---|---|---|
| | | 1 | 2 | 3 | 4 | 5 | 6 | 7 | 8 |
| Resin Composition | 3546-3 | 36.8 | | | 36.8 | | | 36.8 | |
| | 3204EB1 | | 39.3 | | | 39.3 | | | 39.3 |
| | A859B | | | 28.0 | | | 28.0 | | |
| Additive | Sanso Cizer DINA | 0.3 | 0.3 | 0.4 | 0.3 | 0.3 | 0.4 | 0.3 | 0.3 |
| | BYK333 | 0.020 | 0.020 | 0.020 | 0.020 | 0.020 | 0.020 | 0.020 | 0.020 |
| Solvent A | MIBK | 7.2 | 7.0 | 8.3 | 7.2 | 7.0 | 8.3 | 7.2 | 7.0 |
| | PMA | 2.8 | 2.7 | 3.2 | 2.8 | 2.7 | 3.2 | 2.8 | 2.7 |
| | S100 | 10.0 | 9.6 | 11.4 | 10.0 | 9.6 | 11.4 | 10.0 | 9.6 |
| | S150 | 8.6 | 8.3 | 9.8 | 8.6 | 8.3 | 9.8 | 8.6 | 8.3 |
| | EDGAc | 4.5 | 4.3 | 5.1 | 4.5 | 4.3 | 5.1 | 4.5 | 4.3 |

TABLE 4-continued

|  |  | | | | | | | | |
|---|---|---|---|---|---|---|---|---|---|
| Solvent B | Methanol | 12.9 | 12.4 | 14.7 | 12.9 | 12.4 | 14.7 | 12.9 | 12.4 |
| CO$_2$ | | 26.8 | 25.8 | 30.6 | 53.7 | 51.6 | 61.2 | 107.4 | 103.1 |
| Total | | 110 | 110 | 111 | 137 | 135 | 142 | 191 | 187 |
| Mass Ratio: CO$_2$/Total | | 24.4 | 23.5 | 27.4 | 39.2 | 38.1 | 43.1 | 56.3 | 55.1 |
| Mass Ratio: Solvent B/(Solvent B + CO$_2$) | | 32.5 | 32.5 | 32.5 | 19.4 | 19.4 | 19.4 | 10.7 | 10.7 |
| Temperature (° C.) | | 20 | 20 | 20 | 20 | 20 | 20 | 20 | 20 |
| Pressure (MPa) | | 10.0 | 10.0 | 10.0 | 10.0 | 10.0 | 10.0 | 10.0 | 10.0 |
| Results | Leveling Property | ○ | ○ | ○ | ○ | ○ | ○ | ○ | ○ |
|  | State of Mist | ○ | ○ | ○ | ○ | ○ | ○ | ○ | ○ |
|  | Resin Precipitation | ○ | ○ | ○ | ○ | ○ | ○ | ○ | ○ |
| bp$_1$ | | 167.8 | 167.8 | 167.8 | 167.8 | 167.8 | 167.8 | 167.8 | 167.8 |
| bp$_2$ | | 65.0 | 65.0 | 65.0 | 65.0 | 65.0 | 65.0 | 65.0 | 65.0 |
| bp$_1$ − bp$_2$ | | 102.8 | 102.8 | 102.8 | 102.8 | 102.8 | 102.8 | 102.8 | 102.8 |

| | | Example | | | | | | |
|---|---|---|---|---|---|---|---|---|
| | | 9 | 10 | 11 | 12 | 13 | 14 | 15 |
| Resin | 3546-3 | | 36.8 | | | 36.8 | | |
| Composition | 3204EB1 | | | 39.3 | | | 39.3 | |
| | A859B | 28.0 | | | 28.0 | | | 28.0 |
| Additive | Sanso Cizer DINA | 0.4 | 0.3 | 0.3 | 0.4 | 0.3 | 0.3 | 0.4 |
| | BYK333 | 0.020 | 0.020 | 0.020 | 0.020 | 0.020 | 0.020 | 0.020 |
| Solvent A | MIBK | 8.3 | 7.2 | 7.0 | 8.3 | 7.2 | 7.0 | 8.3 |
| | PMA | 3.2 | 2.8 | 2.7 | 3.2 | 2.8 | 2.7 | 3.2 |
| | S100 | 11.4 | 10.0 | 9.6 | 11.4 | 10.0 | 9.6 | 11.4 |
| | S150 | 9.8 | 8.6 | 8.3 | 9.8 | 8.6 | 8.3 | 9.8 |
| | EDGAc | 5.1 | 4.5 | 4.3 | 5.1 | 4.5 | 4.3 | 5.1 |
| Solvent B | Methanol | 14.7 | 12.9 | 12.4 | 14.7 | 12.9 | 12.4 | 14.7 |
| CO$_2$ | | 122.4 | 214.7 | 206.3 | 244.8 | 429.5 | 412.6 | 489.5 |
| Total | | 203 | 298 | 290 | 326 | 513 | 497 | 570 |
| Mass Ratio: CO$_2$/Total | | 60.2 | 72.1 | 71.1 | 75.2 | 83.8 | 83.1 | 85.8 |
| Mass Ratio: Solvent B/(Solvent B + CO$_2$) | | 10.7 | 5.7 | 5.7 | 5.7 | 2.9 | 2.9 | 2.9 |
| Temperature (° C.) | | 20 | 20 | 20 | 20 | 20 | 20 | 20 |
| Pressure (MPa) | | 10.0 | 10.0 | 10.0 | 10.0 | 10.0 | 10.0 | 10.0 |
| Results | Leveling Property | ○ | ○ | ○ | ○ | ○ | ○ | ○ |
| | State of Mist | ○ | ○ | ○ | ○ | ○ | ○ | ○ |
| | Resin Precipitation | ○ | ○ | ○ | ○ | ○ | ○ | ○ |
| bp$_1$ | | 167.8 | 167.8 | 167.8 | 167.8 | 167.8 | 167.8 | 167.8 |
| bp$_2$ | | 65.0 | 65.0 | 65.0 | 65.0 | 65.0 | 65.0 | 65.0 |
| bp$_1$ − bp$_2$ | | 102.8 | 102.8 | 102.8 | 102.8 | 102.8 | 102.8 | 102.8 |

TABLE 5

| | | Example | | |
|---|---|---|---|---|
| | | 16 | 17 | 18 |
| Resin Composition | BZ1160BA | 39.8 | | |
| | Solbin A | | 19.9 | |
| | UR-4800 | | | 48.8 |
| Additive | Sanso Cizer DINA | 0.3 | 0.4 | 0.3 |
| | BYK333 | 0.020 | 0.020 | 0.020 |
| Solvent A | MIBK | 6.9 | 27.7 | 6.2 |
| | PMA | 2.7 | 3.0 | 2.4 |
| | S100 | 9.6 | 10.8 | 8.5 |
| | S150 | 8.2 | 9.3 | 7.3 |
| | EDGAc | 4.2 | 4.8 | 3.8 |
| Solvent B | Methanol | 12.3 | 6.0 | 8.5 |
| | CO$_2$ | 47.9 | 54.3 | 42.7 |
| Total | | 132 | 136 | 128 |
| Mass Ratio: CO$_2$/Total | | 36.3 | 39.9 | 33.2 |
| Mass Ratio: Solvent B/(Solvent B + CO$_2$) | | 20.4 | 10.0 | 16.6 |
| Temperature (° C.) | | 20 | 20 | 20 |
| Pressure (MPa) | | 10.0 | 10.0 | 10.0 |
| Results | Leveling Property | ○ | ○ | ○ |
| | State of Mist | ○ | ○ | ○ |
| | Resin Precipitation | ○ | ○ | ○ |
| bp$_1$ | | 167.8 | 149.6 | 167.8 |
| bp$_2$ | | 65.0 | 65.0 | 65.0 |
| bp$_1$ − bp$_2$ | | 102.8 | 84.6 | 102.8 |

TABLE 6

| | | Example | | | | | | | | | Comparative Example | | |
|---|---|---|---|---|---|---|---|---|---|---|---|---|---|
| | | 19 | 20 | 21 | 22 | 23 | 24 | 25 | 26 | 27 | 1 | 2 | 3 |
| Resin Composition | 3546-3 | 36.8 | | | 36.8 | | | 36.8 | | | 36.8 | | |
| | 3204EB1 | | 39.3 | | | 39.3 | | | 39.3 | | | 39.3 | |
| | A859B | | | 28.0 | | | 28.0 | | | 28.0 | | | 28.0 |
| Additive | Sanso Cizer DINA | 0.3 | 0.3 | 0.4 | 0.3 | 0.3 | 0.4 | 0.3 | 0.3 | 0.4 | 0.3 | 0.3 | 0.4 |
| | BYK333 | 0.020 | 0.020 | 0.020 | 0.020 | 0.020 | 0.020 | 0.020 | 0.020 | 0.020 | 0.020 | 0.020 | 0.020 |
| Solvent A | MIBK | 7.2 | 7.0 | 8.3 | 7.2 | 7.0 | 8.3 | 7.2 | 7.0 | 8.3 | 7.2 | 7.0 | 8.3 |
| | PMA | 2.8 | 2.7 | 3.2 | 2.8 | 2.7 | 3.2 | 2.8 | 2.7 | 3.2 | 2.8 | 2.7 | 3.2 |
| | S100 | 10.0 | 9.6 | 11.4 | 10.0 | 9.6 | 11.4 | 10.0 | 9.6 | 11.4 | 10.0 | 9.6 | 11.4 |
| | S150 | 8.6 | 8.3 | 9.8 | 8.6 | 8.3 | 9.8 | 8.6 | 8.3 | 9.8 | 8.6 | 8.3 | 9.8 |
| | EDGAc | 4.5 | 4.3 | 5.1 | 4.5 | 4.3 | 5.1 | 4.5 | 4.3 | 5.1 | 4.5 | 4.3 | 5.1 |
| Solvent B | Methanol | 6.5 | 6.2 | 7.4 | 4.6 | 4.4 | 5.3 | 3.2 | 3.1 | 3.7 | | | |
| $CO_2$ | | 53.7 | 51.6 | 61.2 | 53.7 | 51.6 | 61.2 | 53.7 | 51.6 | 61.2 | 53.7 | 51.6 | 61.2 |
| Total | | 130 | 129 | 135 | 129 | 128 | 133 | 127 | 126 | 131 | 124 | 123 | 127 |
| Mass Ratio: $CO_2$/Total | | 41.1 | 39.9 | 45.4 | 41.7 | 40.4 | 46.1 | 42.2 | 40.9 | 46.7 | 43.3 | 41.9 | 48.0 |
| Mass Ratio: Solvent B/(Solvent B + $CO_2$) | | 10.7 | 10.7 | 10.7 | 7.9 | 7.9 | 7.9 | 5.7 | 5.7 | 5.7 | — | — | — |
| Temperature (° C.) | | 20 | 20 | 20 | 20 | 20 | 20 | 20 | 20 | 20 | 20 | 20 | 20 |
| Pressure (MPa) | | 10.0 | 10.0 | 10.0 | 10.0 | 10.0 | 10.0 | 10.0 | 10.0 | 10.0 | 10.0 | 10.0 | 10.0 |
| Results | Leveling Property | ○ | ○ | ○ | ○ | ○ | ○ | ○ | ○ | ○ | X | X | X |
| | State of Mist | ○ | ○ | ○ | ○ | ○ | ○ | ○ | ○ | ○ | X | X | X |
| | Resin Precipitation | ○ | ○ | ○ | ○ | ○ | ○ | Δ | Δ | Δ | X | X | X |
| $bp_1$ | | 167.8 | 167.8 | 167.8 | 167.8 | 167.8 | 167.8 | 167.8 | 167.8 | 167.8 | 167.8 | 167.8 | 167.8 |
| $bp_2$ | | 65.0 | 65.0 | 65.0 | 65.0 | 65.0 | 65.0 | 65.0 | 65.0 | 65.0 | — | — | — |
| $bp_1 - bp_2$ | | 102.8 | 102.8 | 102.8 | 102.8 | 102.8 | 102.8 | 102.8 | 102.8 | 102.8 | — | — | — |

TABLE 7

| | | Example | | | | Comparative Example | | |
|---|---|---|---|---|---|---|---|---|
| | | 28 | 29 | 30 | 31 | 4 | 5 | 6 |
| Resin Composition | A859B | 28.0 | 28.0 | 28.0 | 28.0 | 28.0 | 28.0 | 28.0 |
| Additive | Sanso Cizer DINA | 0.4 | 0.4 | 0.4 | 0.4 | 0.4 | 0.4 | 0.4 |
| | BYK333 | 0.020 | 0.020 | 0.020 | 0.020 | 0.020 | 0.020 | 0.020 |
| Solvent A | MIBK | 8.3 | 8.3 | 8.3 | 8.3 | 8.3 | 8.3 | 8.3 |
| | PMA | 3.2 | 3.2 | 3.2 | 3.2 | 3.2 | 3.2 | 3.2 |
| | S100 | 11.4 | 11.4 | 11.4 | 11.4 | 11.4 | 11.4 | 11.4 |
| | S150 | 9.8 | 9.8 | 9.8 | 9.8 | 9.8 | 9.8 | 9.8 |
| | EDGAc | 5.1 | 5.1 | 5.1 | 5.1 | 5.1 | 5.1 | 5.1 |
| Solvent B | Formamide | | | | | | | |
| | Butyrolactone | | | | | | | 7.4 |
| | Propylene Glycol | | | | | | 7.4 | |
| | Ethanol | | | | 7.4 | | | |
| | Dimethylformamide | | | 7.4 | | | | |
| | Acetonitrile | | 7.4 | | | | | |
| | IPA | 7.4 | | | | | | |
| | DMSO (Dimethyl Sulfoxide) | | | | | 7.4 | | |
| $CO_2$ | | 61.2 | 61.2 | 61.2 | 61.2 | 61.2 | 61.2 | 61.2 |
| Total | | 135 | 135 | 135 | 135 | 135 | 135 | 135 |
| Mass Ratio: $CO_2$/Total | | 45.4 | 45.4 | 45.4 | 45.4 | 45.4 | 45.4 | 45.4 |
| Mass Ratio: Solvent B/(Solvent B + $CO_2$) | | 10.7 | 10.7 | 10.7 | 10.7 | 10.7 | 10.7 | 10.7 |
| Temperature (° C.) | | 20 | 20 | 20 | 20 | 20 | 20 | 20 |
| Pressure (MPa) | | 10.0 | 10.0 | 10.0 | 10.0 | 10.0 | 10.0 | 10.0 |
| Results | Leveling Property | ○ | ○ | ○ | ○ | X | X | X |
| | State of Mist | ○ | ○ | ○ | ○ | ○ | ○ | ○ |
| | Resin Precipitation | ○ | ○ | ○ | ○ | ○ | ○ | ○ |
| $bp_1$ | | 167.8 | 167.8 | 167.8 | 167.8 | 167.8 | 167.8 | 167.8 |
| $bp_2$ | | 83.0 | 82.0 | 153.0 | 78.0 | 190.0 | 188.0 | 204.0 |
| $bp_1 - bp_2$ | | 84.8 | 85.8 | 14.8 | 89.8 | −22.2 | −20.2 | −36.2 |

TABLE 7-continued

|  |  | Comparative Example | | | Example | | |
|---|---|---|---|---|---|---|---|
|  |  | 7 | 8 | 9 | 32 | 33 | 34 |
| Resin Composition | A859B | 28.0 | 28.0 | 28.0 | 28.0 | 28.0 | 28.0 |
| Additive | Sanso Cizer DINA | 0.4 | 0.4 | 0.4 | 0.4 | 0.4 | 0.4 |
|  | BYK333 | 0.020 | 0.020 | 0.020 | 0.020 | 0.020 | 0.020 |
| Solvent A | MIBK | 8.3 | 8.3 | 8.3 | 8.3 | 8.3 | 8.3 |
|  | PMA | 3.2 | 3.2 | 3.2 | 3.2 | 3.2 | 3.2 |
|  | S100 | 11.4 | 11.4 | 11.4 | 11.4 | 11.4 | 11.4 |
|  | S150 | 9.8 | 9.8 | 9.8 | 9.8 | 9.8 | 9.8 |
|  | EDGAc | 5.1 | 5.1 | 5.1 | 5.1 | 5.1 | 5.1 |
| Solvent B | Formamide | 7.4 |  |  |  |  |  |
|  | Butyrolactone |  |  |  |  |  |  |
|  | Propylene Glycol |  |  |  |  |  |  |
|  | Ethanol |  |  |  |  |  |  |
|  | Dimethylformamide |  | 2.44 | 4.44 | 4.84 | 5.44 | 6.44 |
|  | Acetonitrile |  |  |  |  |  |  |
|  | IPA |  |  |  |  |  |  |
|  | DMSO (Dimethyl Sulfoxide) |  | 4.96 | 2.96 | 2.56 | 1.96 | 0.96 |
| $CO_2$ |  | 61.2 | 61.2 | 61.2 | 61.2 | 61.2 | 61.2 |
| Total |  | 135 | 135 | 135 | 135 | 135 | 135 |
| Mass Ratio: $CO_2$/Total |  | 45.4 | 45.4 | 45.4 | 45.4 | 45.4 | 45.4 |
| Mass Ratio: Solvent B/(Solvent B + $CO_2$) |  | 10.7 | 10.7 | 10.7 | 10.7 | 10.7 | 10.7 |
| Temperature (° C.) |  | 20 | 20 | 20 | 20 | 20 | 20 |
| Pressure (MPa) |  | 10.0 | 10.0 | 10.0 | 10.0 | 10.0 | 10.0 |
| Results | Leveling Property | X | X | Δ | ○ | ○ | ○ |
|  | State of Mist | ○ | ○ | ○ | ○ | ○ | ○ |
|  | Resin Precipitation | ○ | ○ | ○ | ○ | ○ | ○ |
| $bp_1$ |  | 167.8 | 167.8 | 167.8 | 167.8 | 167.8 | 167.8 |
| $bp_2$ |  | 210.0 | 177.8 | 167.8 | 165.8 | 162.8 | 157.8 |
| $bp_1 - bp_2$ |  | −42.2 | −10.0 | 0.0 | 2.0 | 5.0 | 10.0 |

TABLE 8

|  |  | Example | | | | | | | | | | Comparative Example | |
|---|---|---|---|---|---|---|---|---|---|---|---|---|
|  |  | 35 | 36 | 37 | 38 | 39 | 40 | 41 | 42 | 43 | 44 | 10 | 11 |
| Resin Composition | A859B | 44.8 | 44.8 | 44.8 | 44.8 | 44.8 |  |  |  |  |  |  |  |
|  | WGU-337 |  |  |  |  |  | 43.4 | 43.4 | 43.4 | 43.4 | 43.4 | 43.4 | 43.4 |
| Additive | BYK333 | 0.017 | 0.017 | 0.017 | 0.017 | 0.017 | 0.016 | 0.016 | 0.016 | 0.016 | 0.016 | 0.016 | 0.016 |
|  | BYK355 | 0.04 | 0.04 | 0.04 | 0.04 | 0.04 | 0.04 | 0.04 | 0.04 | 0.04 | 0.04 | 0.04 | 0.04 |
|  | Ti400 | 0.67 | 0.67 | 0.67 | 0.67 | 0.67 | 0.65 | 0.65 | 0.65 | 0.65 | 0.65 | 0.65 | 0.65 |
|  | Ti123 | 0.33 | 0.33 | 0.33 | 0.33 | 0.33 | 0.32 | 0.32 | 0.32 | 0.32 | 0.32 | 0.32 | 0.32 |
| Solvent A | PMA | 7.8 | 7.8 | 7.8 | 7.8 | 7.8 | 7.5 | 7.5 | 7.5 | 7.5 | 7.5 | 7.5 | 7.5 |
|  | S100 | 7.8 | 7.8 | 7.8 | 7.8 | 7.8 | 7.5 | 7.5 | 7.5 | 7.5 | 7.5 | 7.5 | 7.5 |
|  | EDGAc | 2.5 | 2.5 | 2.5 | 2.5 | 2.5 | 2.4 | 2.4 | 2.4 | 2.4 | 2.4 | 2.4 | 2.4 |
| Isocyanate Curing Agent |  | 15.5 | 15.5 | 15.5 | 15.5 | 15.5 | 18.1 | 18.1 | 18.1 | 18.1 | 18.1 | 18.1 | 18.1 |
| Solvent B | Acetonitrile | 8.9 | 8.9 | 8.9 | 8.9 | 8.9 | 8.7 | 8.7 | 8.7 | 8.7 | 8.7 |  |  |
| $CO_2$ |  | 29.1 | 58.1 | 116.3 | 232.6 | 465.2 | 28.2 | 56.4 | 112.8 | 225.6 | 451.1 | 28.2 | 451.1 |
| Total |  | 117 | 147 | 205 | 321 | 554 | 117 | 145 | 202 | 314 | 540 | 108 | 531 |
| Mass Ratio: $CO_2$/Total |  | 24.8 | 39.7 | 56.8 | 72.5 | 84.0 | 24.1 | 38.9 | 56.0 | 71.8 | 83.6 | 26.0 | 84.9 |
| Mass Ratio: Solvent B/(Solvent B + $CO_2$) |  | 23.5 | 13.3 | 7.1 | 3.7 | 1.9 | 23.5 | 13.3 | 7.1 | 3.7 | 1.9 | — | — |
| Temperature (° C.) |  | 20 | 20 | 20 | 20 | 20 | 20 | 20 | 20 | 20 | 20 | 20 | 20 |
| Pressure (MPa) |  | 10.0 | 10.0 | 10.0 | 10.0 | 10.0 | 10.0 | 10.0 | 10.0 | 10.0 | 10.0 | 10.0 | 10.0 |
| Results | Leveling Property | ○ | ○ | ○ | ○ | ○ | ○ | ○ | ○ | ○ | ○ | X | X |
|  | State of Mist | ○ | ○ | ○ | ○ | ○ | ○ | ○ | ○ | ○ | ○ | X | X |
|  | Resin Precipitation | ○ | ○ | ○ | ○ | ○ | ○ | ○ | ○ | ○ | ○ | X | X |
| $bp_1$ |  | 162.6 | 162.6 | 162.6 | 162.6 | 162.6 | 162.6 | 162.6 | 162.6 | 162.6 | 162.6 | 162.6 | 162.6 |
| $bp_2$ |  | 82.0 | 82.0 | 82.0 | 82.0 | 82.0 | 82.0 | 82.0 | 82.0 | 82.0 | 82.0 | — | — |
| $bp_1 - bp_2$ |  | 80.6 | 80.6 | 80.6 | 80.6 | 80.6 | 80.6 | 80.6 | 80.6 | 80.6 | 80.6 | — | — |

TABLE 9

|  |  | Example | | | | |
|---|---|---|---|---|---|---|
|  |  | 45 | 46 | 47 | 48 | 49 |
| Resin Composition | UK9050 | 14.0 | 14.0 | 14.0 | 14.0 | 14.0 |
|  | M350 | 14.0 | 14.0 | 14.0 | 14.0 | 14.0 |
|  | M402 | 7.0 | 7.0 | 7.0 | 7.0 | 7.0 |
| Additive | BYK333 | 0.037 | 0.037 | 0.037 | 0.037 | 0.037 |
|  | IRUGACURE184 | 1.4 | 1.4 | 1.4 | 1.4 | 1.4 |
| Solvent A | MIBK | 14.9 | 14.9 | 14.9 | 14.9 | 14.9 |
|  | DIBK | 14.9 | 14.9 | 14.9 | 14.9 | 14.9 |
| Solvent B | IPA | 15.0 | 15.0 | 15.0 | 15.0 | 15.0 |
|  | Methanol | 7.5 | 7.5 | 7.5 | 7.5 | 7.5 |
| $CO_2$ |  | 28.0 | 56.1 | 112.1 | 224.2 | 448.4 |
| Total |  | 117 | 145 | 201 | 313 | 537 |
| Mass Ratio: $CO_2$/Total |  | 24.0 | 38.7 | 55.8 | 71.6 | 83.5 |
| Mass Ratio: Solvent B/(Solvent B + $CO_2$) |  | 44.5 | 28.6 | 16.7 | 9.1 | 4.8 |
| Temperature (° C.) |  | 20 | 20 | 20 | 20 | 20 |
| Pressure (MPa) |  | 10.0 | 10.0 | 10.0 | 10.0 | 10.0 |
| Results | Leveling Property | ◯ | ◯ | ◯ | ◯ | ◯ |
|  | State of Mist | ◯ | ◯ | ◯ | ◯ | ◯ |
|  | Resin Precipitation | ◯ | ◯ | ◯ | ◯ | ◯ |
| $bp_1$ |  | 142.5 | 142.5 | 142.5 | 142.5 | 142.5 |
| $bp_2$ |  | 77.0 | 77.0 | 77.0 | 77.0 | 77.0 |
| $bp_1 - bp_2$ |  | 65.4 | 65.4 | 65.4 | 65.4 | 65.4 |

TABLE 10

|  |  | Example | | | | | | | | | |
|---|---|---|---|---|---|---|---|---|---|---|---|
|  |  | 50 | 51 | 52 | 53 | 54 | 55 | 56 | 57 | 58 | 59 |
| Resin Composition | BL616BA | 21.2 | 26.5 | 23.6 | 23.1 | 26.5 | 26.5 | 23.6 | 24.1 | 25.6 | 22.3 |
|  | CAB551-0.2 | 2.6 | 3.2 | 2.9 | 2.8 | 3.2 | 3.2 | 2.9 | 2.9 | 3.1 | 2.7 |
| Additive | Sanso Cizer DINA | 0.3 | 0.3 | 0.3 | 0.3 | 0.3 | 0.3 | 0.3 | 0.3 | 0.3 | 0.3 |
|  | BYK333 | 0.020 | 0.020 | 0.020 | 0.020 | 0.020 | 0.020 | 0.020 | 0.020 | 0.020 | 0.020 |
|  | Ajisper 881 | 0.9 | 1.3 |  | 2.1 | 1.2 |  | 1.1 |  |  | 2.0 |
|  | EFKA4400 |  |  |  |  |  | 1.0 |  |  | 0.9 |  |
|  | Solsperse 32500 |  |  | 1.1 |  |  |  |  |  |  |  |
|  | BYK166 |  |  |  |  |  |  |  | 1.1 |  |  |
| Pigment | CR97 | 12.8 |  |  |  |  |  |  |  |  |  |
|  | MA100 |  | 1.2 |  |  |  |  |  |  |  |  |
|  | CyanineBlueG314 |  |  | 2.0 |  |  |  |  |  |  |  |
|  | Hostaperm Violet RLNF |  |  |  | 2.0 |  |  |  |  |  |  |
|  | Sicotrans Red L2817 |  |  |  |  | 2.4 |  |  |  |  |  |
|  | Fastgenn SuperRed7061B |  |  |  |  |  | 2.4 |  |  |  |  |
|  | DPP Rubine FTX |  |  |  |  |  |  | 2.1 |  |  |  |
|  | DPP Scarlet EK |  |  |  |  |  |  |  | 2.2 |  |  |
|  | 2GLTE |  |  |  |  |  |  |  |  | 2.3 |  |
|  | 5GLT |  |  |  |  |  |  |  |  |  | 2.0 |
|  | EFKA6745 |  | 0.1 | 0.1 | 0.1 |  |  |  |  |  |  |
| Solvent A | MIBK | 18.9 | 22.9 | 26.2 | 25.8 | 21.9 | 22.2 | 26.1 | 25.4 | 23.5 | 27.1 |
|  | MeAc | 1.3 | 1.6 | 1.4 | 1.4 | 1.6 | 1.6 | 1.4 | 1.5 | 1.5 | 1.3 |
|  | PMA | 3.0 | 3.0 | 3.0 | 3.0 | 3.0 | 3.0 | 3.0 | 3.0 | 3.0 | 3.0 |
|  | S100 | 5.6 | 6.2 | 5.9 | 5.8 | 6.2 | 6.2 | 5.9 | 5.9 | 6.1 | 5.7 |
|  | S150 | 4.5 | 4.5 | 4.5 | 4.5 | 4.5 | 4.5 | 4.5 | 4.5 | 4.5 | 4.5 |
| Solvent B | Methanol | 10.9 | 10.9 | 10.9 | 10.9 | 10.9 | 10.9 | 10.9 | 10.9 | 10.9 | 10.9 |
| $CO_2$ |  | 54.5 | 54.5 | 54.5 | 54.5 | 54.5 | 54.5 | 54.5 | 54.5 | 54.5 | 54.5 |
| Total |  | 136 | 136 | 136 | 136 | 136 | 136 | 136 | 136 | 136 | 136 |
| Mass Ratio: $CO_2$/Total |  | 40.0 | 40.0 | 40.0 | 40.0 | 40.0 | 40.0 | 40.0 | 40.0 | 40.0 | 40.0 |
| Mass Ratio: Solvent B/(Solvent B + $CO_2$) |  | 16.6 | 16.6 | 16.6 | 16.6 | 16.6 | 16.6 | 16.6 | 16.6 | 16.6 | 16.6 |
| Temperature (° C.) |  | 20 | 20 | 20 | 20 | 20 | 20 | 20 | 20 | 20 | 20 |
| Pressure (MPa) |  | 10.0 | 10.0 | 10.0 | 10.0 | 10.0 | 10.0 | 10.0 | 10.0 | 10.0 | 10.0 |
| Results | Leveling Property | ◯ | ◯ | ◯ | ◯ | ◯ | ◯ | ◯ | ◯ | ◯ | ◯ |
|  | State of Mist | ◯ | ◯ | ◯ | ◯ | ◯ | ◯ | ◯ | ◯ | ◯ | ◯ |
|  | Resin Precipitation | ◯ | ◯ | ◯ | ◯ | ◯ | ◯ | ◯ | ◯ | ◯ | ◯ |

TABLE 10-continued

| | Example | | | | | | | | | |
|---|---|---|---|---|---|---|---|---|---|---|
| | | 50 | 51 | 52 | 53 | 54 | 55 | 56 | 57 | 58 | 59 |
| $bp_1$ | | 140.2 | 138.4 | 136.3 | 136.4 | 139.0 | 138.8 | 136.3 | 136.7 | 137.9 | 135.7 |
| $bp_2$ | | 65.0 | 65.0 | 65.0 | 65.0 | 65.0 | 65.0 | 65.0 | 65.0 | 65.0 | 65.0 |
| $bp_1 - bp_2$ | | 75.2 | 73.4 | 71.3 | 71.4 | 74.0 | 73.8 | 71.3 | 71.7 | 72.9 | 70.7 |

TABLE 11

| | | Example | | | | | | | | | |
|---|---|---|---|---|---|---|---|---|---|---|---|
| | | 60 | 61 | 62 | 63 | 64 | 65 | 66 | 67 | 68 | 69 |
| Resin Composition | BL616BA | 21.2 | 26.5 | 23.6 | 23.1 | 26.5 | 26.5 | 23.6 | 24.1 | 25.6 | 22.3 |
| | CAB551-0.2 | 2.6 | 3.2 | 2.9 | 2.8 | 3.2 | 3.2 | 2.9 | 2.9 | 3.1 | 2.7 |
| Additive | Sanso Cizer DINA | 0.3 | 0.3 | 0.3 | 0.3 | 0.3 | 0.3 | 0.3 | 0.3 | 0.3 | 0.3 |
| | BYK333 | 0.020 | 0.020 | 0.020 | 0.020 | 0.020 | 0.020 | 0.020 | 0.020 | 0.020 | 0.020 |
| | Ajisper 881 | 0.9 | 1.3 | | 2.1 | 1.2 | | 1.1 | | | 2.0 |
| | EFKA4400 | | | | | | 1.0 | | | 0.9 | |
| | Solsperse 32500 | | | 1.1 | | | | | | | |
| | BYK166 | | | | | | | | 1.1 | | |
| Pigment | CR97 | 12.8 | | | | | | | | | |
| | MA100 | | 1.2 | | | | | | | | |
| | CyanineBlueG314 | | | 2.0 | | | | | | | |
| | Hostaperm Violet RLNF | | | | 2.0 | | | | | | |
| | Sicotrans Red L2817 | | | | | 2.4 | | | | | |
| | Fastgenn SuperRed7061B | | | | | | 2.4 | | | | |
| | DPP Rubine FTX | | | | | | | 2.1 | | | |
| | DPP Scarlet EK | | | | | | | | 2.2 | | |
| | 2GLTE | | | | | | | | | 2.3 | |
| | 5GLT | | | | | | | | | | 2.0 |
| | EFKA6745 | | 0.1 | 0.1 | 0.1 | | | | | | |
| Solvent A | MIBK | 18.9 | 22.9 | 26.2 | 25.8 | 21.9 | 22.2 | 26.1 | 25.4 | 23.5 | 27.1 |
| | MeAc | 1.3 | 1.6 | 1.4 | 1.4 | 1.6 | 1.6 | 1.4 | 1.5 | 1.5 | 1.3 |
| | PMA | 3.0 | 3.0 | 3.0 | 3.0 | 3.0 | 3.0 | 3.0 | 3.0 | 3.0 | 3.0 |
| | S100 | 5.6 | 6.2 | 5.9 | 5.8 | 6.2 | 6.2 | 5.9 | 5.9 | 6.1 | 5.7 |
| | S150 | 4.5 | 4.5 | 4.5 | 4.5 | 4.5 | 4.5 | 4.5 | 4.5 | 4.5 | 4.5 |
| Solvent B | Methanol | 10.9 | 10.9 | 10.9 | 10.9 | 10.9 | 10.9 | 10.9 | 10.9 | 10.9 | 10.9 |
| $CO_2$ | | 163.5 | 163.5 | 163.5 | 163.5 | 163.5 | 163.5 | 163.5 | 163.5 | 163.5 | 163.5 |
| Total | | 245 | 245 | 245 | 245 | 245 | 245 | 245 | 245 | 245 | 245 |
| Mass Ratio: $CO_2$/Total | | 66.6 | 66.6 | 66.6 | 66.6 | 66.6 | 66.6 | 66.6 | 66.6 | 66.6 | 66.6 |
| Mass Ratio: Solvent B/(Solvent B + $CO_2$) | | 6.2 | 6.2 | 6.2 | 6.2 | 6.2 | 6.2 | 6.2 | 6.2 | 6.2 | 6.2 |
| Temperature (° C.) | | 20 | 20 | 20 | 20 | 20 | 20 | 20 | 20 | 20 | 20 |
| Pressure (MPa) | | 10.0 | 10.0 | 10.0 | 10.0 | 10.0 | 10.0 | 10.0 | 10.0 | 10.0 | 10.0 |
| Results | Leveling Property | ◯ | ◯ | ◯ | ◯ | ◯ | ◯ | ◯ | ◯ | ◯ | ◯ |
| | State of Mist | ◯ | ◯ | ◯ | ◯ | ◯ | ◯ | ◯ | ◯ | ◯ | ◯ |
| | Resin Precipitation | ◯ | ◯ | ◯ | ◯ | ◯ | ◯ | ◯ | ◯ | ◯ | ◯ |
| $bp_1$ | | 140.2 | 138.4 | 136.3 | 136.4 | 139.0 | 138.8 | 136.3 | 136.7 | 137.9 | 135.7 |
| $bp_2$ | | 65.0 | 65.0 | 65.0 | 65.0 | 65.0 | 65.0 | 65.0 | 65.0 | 65.0 | 65.0 |
| $bp_1 - bp_2$ | | 75.2 | 73.4 | 71.3 | 71.4 | 74.0 | 73.8 | 71.3 | 71.7 | 72.9 | 70.7 |

In the carbon dioxide coating apparatus employing the three-component continuous mixing system as illustrated in FIG. 1, the paint tank 1 was charged with a mixture 1 of the resin composition, the additives, and the solvents A (the first solvents) precedently prepared in accordance with each of the examples shown in Tables 4 to 11. The flow rate of the high-pressure paint pump 2 was set to 50 g/min. The solvent tank 10 was charged with the solvents B (the second solvents), and the flow rate of the high-pressure solvent pump 11 was set so as to obtain the mixing ratios shown in Tables 4 to 11. The flow rate of the high-pressure $CO_2$ pump 6 was set so as to obtain the mixing ratios shown in Tables 4 to 11. It is noted that the mixing ratios of the components in these tables are expressed in parts by mass. Then, in the first mixer 12, carbon dioxide and the second solvent were mixed under conditions of a temperature of 20° C. and a pressure of 10 MPa to obtain a mixture 2. Thereafter, in the second mixer 8, the mixture 2 was mixed with the mixture 1 under conditions of a temperature of 20° C. and a pressure of 10 MPa to obtain the coating liquid composition. The retention time of the liquid from the preparation of the coating liquid composition to spray coating was set to 5 seconds, and a coating test for 5 minutes was performed three times, so as to evaluate the leveling property, the state of mist and the resin precipitation. The results are shown in Tables 4 to 11.

The leveling property was evaluated by visually checking the surface of the coating having been dried with a dryer at 60° C. after allowing the membrane to stand still for 10 minutes at 20° C. after the coating. In the evaluation of the leveling property shown in Tables 4 to 11, ○ means that the surface was flat with no irregularities (orange peel texture), Δ means that the surface had slight irregularities (orange peel texture), and X means that the surface had serious irregularities (orange peel texture).

The state of mist was evaluated by visually observing the fineness of mist formed by spraying the coating liquid composition. In the evaluation of the state of mist shown in Tables 4 to 11, ○ means that a fine mist was formed, Δ means that not a fine mist but, for example, a thread-shaped or large particle was formed, and X means that mist was not formed because the nozzle was clogged.

The resin precipitation was evaluated depending on whether or not the nozzle was clogged. In the evaluation of the resin precipitation shown in Tables 4 to 11, ○ means that the coating was successful three times, Δ means that the coating was successful once or twice, and X means that the coating was not successful. It is noted that "successful" means that the coating for 5 minutes was completed without clogging the nozzle.

Comparative Examples 1 to 11

The coating test was performed in the same manner as in Examples 1 to 69 except that mixing ratios of the components were set to values shown in Tables 6 to 8. The results are shown in Tables 6 to 8.

REFERENCE SIGNS LIST

1 . . . paint tank, 2 . . . high-pressure paint pump, 3 . . . paint heater, 4 . . . $CO_2$ cylinder, 5 . . . $CO_2$ condenser, 6 . . . high-pressure $CO_2$ pump, 7 . . . $CO_2$ heater, 8 . . . second mixer, 9 . . . spray gun, 10 . . . solvent tank, 11 . . . high-pressure solvent pump, 12 . . . first mixer.

The invention claimed is:

1. A coating liquid composition, comprising:
a resin component;
a first solvent having a solubility parameter lower than 23.5 $(MPa)^{0.5}$;
carbon dioxide; and
a second solvent having a solubility parameter of 23.5 $(MPa)^{0.5}$ to 40 $(MPa)^{0.5}$,
wherein an average boiling point $bp_1$ of the first solvent and an average boiling point $bp_2$ of the second solvent satisfy a relationship of $bp_1-bp_2>0$.

2. The coating liquid composition according to claim 1, wherein an amount of the carbon dioxide is 23.5% by mass or more with respect to a total amount of the coating liquid composition.

3. The coating liquid composition according to claim 1, wherein an amount of the second solvent is 0.5% by mass to 95% by mass with respect to a total amount of the carbon dioxide and the second solvent.

4. A method for forming a coating, comprising:
a step of spraying the coating liquid composition according to claim 1 from a nozzle onto a target to form a liquid membrane; and
a step of solidifying the liquid membrane to form a coating.

5. A method for producing a coating liquid composition according to claim 1, comprising:
a step of mixing a resin component, a first solvent having a solubility parameter lower than 23.5 $(MPa)^{0.5}$, carbon dioxide, and a second solvent having a solubility parameter of 23.5 $(MPa)^{0.5}$ to 40 $(MPa)^{0.5}$ to obtain a coating liquid composition,
wherein an average boiling point $bp_1$ of the first solvent and an average boiling point $bp_2$ of the second solvent satisfy a relationship of $bp_1-bp_2>0$.

6. The method according to claim 5,
wherein the step of mixing includes:
a step of mixing the carbon dioxide and the second solvent; and
a step of mixing a mixture of the resin component and the first solvent with the mixture of the carbon dioxide and the second solvent.

7. The method according to claim 5,
wherein the step of mixing includes a step of mixing the carbon dioxide with a mixture of the resin component, the first solvent and the second solvent.

8. A composition for preparation of a carbon dioxide-containing coating liquid composition, comprising:
a resin component;
a first solvent having a solubility parameter lower than 23.5 $(MPa)^{0.5}$; and
a second solvent having a solubility parameter of 23.5 $(MPa)^{0.5}$ to 40 $(MPa)^{0.5}$,
wherein an average boiling point $bp_1$ of the first solvent and an average boiling point $bp_2$ of the second solvent satisfy a relationship of $bp_1-bp_2>0$.

9. The coating liquid composition according to claim 2, wherein an amount of the second solvent is 0.5% by mass to 95% by mass with respect to a total amount of the carbon dioxide and the second solvent.

10. A method for forming a coating, comprising:
a step of spraying the coating liquid composition according to claim 2 from a nozzle onto a target to form a liquid membrane; and
a step of solidifying the liquid membrane to form a coating.

11. A method for forming a coating, comprising:
a step of spraying the coating liquid composition according to claim 3 from a nozzle onto a target to form a liquid membrane; and
a step of solidifying the liquid membrane to form a coating.

* * * * *